United States Patent
Ishihara

(10) Patent No.: US 11,783,468 B2
(45) Date of Patent: Oct. 10, 2023

(54) IMAGE PROCESSING APPARATUS, IMAGE PROCESSING METHOD, AND STORAGE MEDIUM FOR PNIS OF CHAINS

(71) Applicant: CASIO COMPUTER CO., LTD., Tokyo (JP)

(72) Inventor: Muneyuki Ishihara, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 273 days.

(21) Appl. No.: 17/204,697

(22) Filed: Mar. 17, 2021

(65) Prior Publication Data
US 2021/0295489 A1  Sep. 23, 2021

(30) Foreign Application Priority Data
Mar. 23, 2020  (JP) ................................. 2020-051053

(51) Int. Cl.
*G06T 7/00* (2017.01)
*G06F 18/22* (2023.01)
*G06V 20/80* (2022.01)

(52) U.S. Cl.
CPC ............ *G06T 7/0006* (2013.01); *G06F 18/22* (2023.01); *G06T 7/001* (2013.01); *G06V 20/80* (2022.01); *G06T 2207/30204* (2013.01)

(58) Field of Classification Search
CPC ................... G06T 7/0006; G06T 7/001; G06T 2207/30204; G06F 18/22; G06V 20/80
See application file for complete search history.

(56) References Cited

U.S. PATENT DOCUMENTS

| | | | | |
|---|---|---|---|---|
| 2012/0269447 A1* | 10/2012 | Kouno | ..................... | F16G 13/06 382/203 |
| 2016/0116356 A1* | 4/2016 | Goldstein | ............... | G01L 3/247 73/1.15 |
| 2017/0225901 A1* | 8/2017 | Brown | ................... | B65G 43/02 |

FOREIGN PATENT DOCUMENTS

| | | | |
|---|---|---|---|
| JP | H10318721 A | * | 1/1997 |
| JP | 2006-317359 A | | 11/2006 |
| JP | 2007-285880 A | | 11/2007 |

(Continued)

OTHER PUBLICATIONS

JPO; Application No. 2020-051053; Notice of Reasons for Refusal dated Feb. 1, 2022.

*Primary Examiner* — Edward F Urban
*Assistant Examiner* — Wassim Mahrouka
(74) *Attorney, Agent, or Firm* — Fitch, Even, Tabin & Flannery LLP

(57) ABSTRACT

An image processing apparatus includes at least one processor executing the following processing including: image acquiring processing that acquires an image of an object in which a plurality of subjects, which are individually identifiable, are provided in a predetermined direction, the image including at least two subjects among the plurality of subjects; identifying processing that generates an information image including a feature amount of each of the subjects included in the image acquired in the image acquiring processing, and identifies each of the subjects by comparing with an information image stored in advance in memory; and output control processing that measures a distance between the subjects, each identified in the identifying processing, and controls to output a measurement result.

12 Claims, 9 Drawing Sheets

(56) References Cited

FOREIGN PATENT DOCUMENTS

JP      2019-132668 A      8/2019
WO    WO-2019168182 A1 *  9/2019

\* cited by examiner

FIG. 1
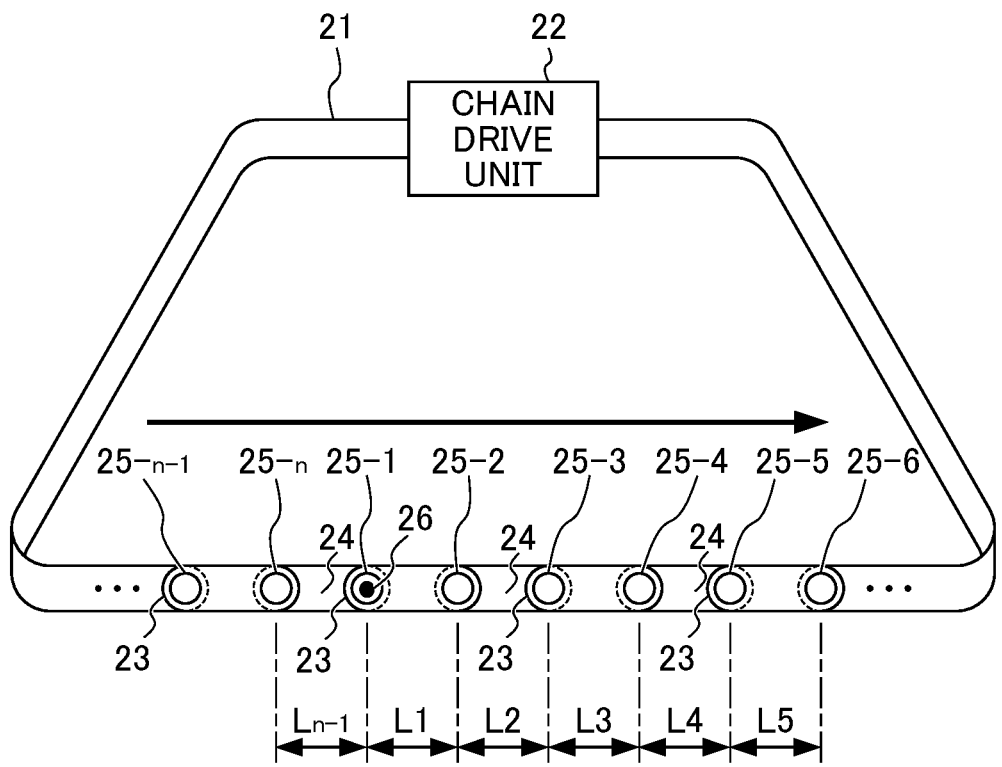
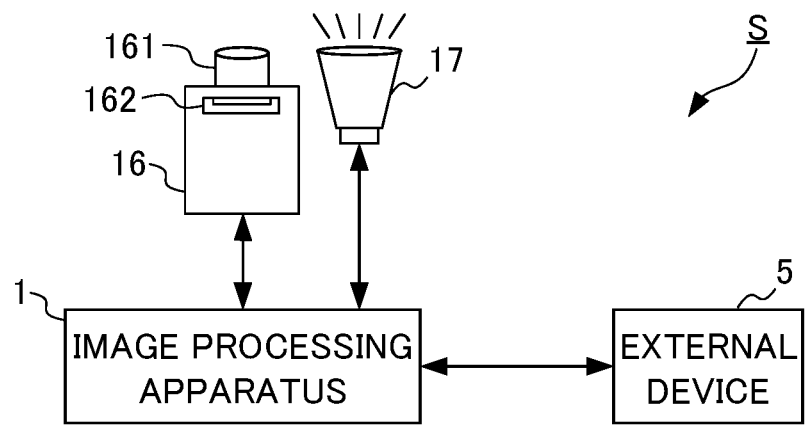

IMAGE PROCESSING APPARATUS, IMAGE PROCESSING METHOD, AND STORAGE MEDIUM FOR PNIS OF CHAINS

This application is based on and claims the benefit of priority from Japanese Patent Application No. 2020-051053, filed on 23 Mar. 2020, the content of which is incorporated herein by reference.

BACKGROUND OF THE INVENTION

Field of the Invention

The present invention relates to an image processing apparatus, an image processing method, and a recording medium.

Related Art

Conventionally, a technique has been known which images a moving object such as a conveyor chain and detects malfunctions or abnormality of the object by image analysis. For example, Japanese Unexamined Patent Application, Publication No. 2006-317359 discloses such a technique.

Japanese Unexamined Patent Application, Publication No. 2006-317359 discloses a technique of controlling the timing at which an image of a moving conveyor chain is captured, sequentially acquiring images in which a pin connecting an inner link and an outer link come to a fixed position, and analyzing the images, thereby detecting a change in the shape of the chain.

By utilizing the technique of image analysis, aging degradation and malfunction of the chain can be detected without a human measuring the change in shape of the coupling part of the chain using a tool such as calipers, making it possible to save time and cost. However, in the image analysis, a difference between individual pins and dust or waste adhering to the lubricant applied to the chain cause a decrease in detection accuracy. There is room for improvement in the prior art in terms of improvements in detection accuracy.

SUMMARY OF THE INVENTION

An image processing apparatus according to an aspect of the present invention includes at least one processor executing the following processing including: image acquiring processing that acquires an image of an object in which a plurality of subjects, which are individually identifiable, are provided in a predetermined direction, the image including at least two subjects among the plurality of subjects; identifying processing that generates an information image including a feature amount of each of the subjects included in the image acquired in the image acquiring processing, and identifies each of the subjects by comparing with an information image stored in advance in memory; and output control processing that measures a distance between the subjects, each identified in the identifying processing, and controls to output a measurement result.

BRIEF DESCRIPTION OF THE DRAWINGS

FIG. 1 is a system configuration diagram showing the configuration of an image processing system including an image processing apparatus according to an embodiment of the present invention;

DETAILED DESCRIPTION OF THE INVENTION

Figure 2:
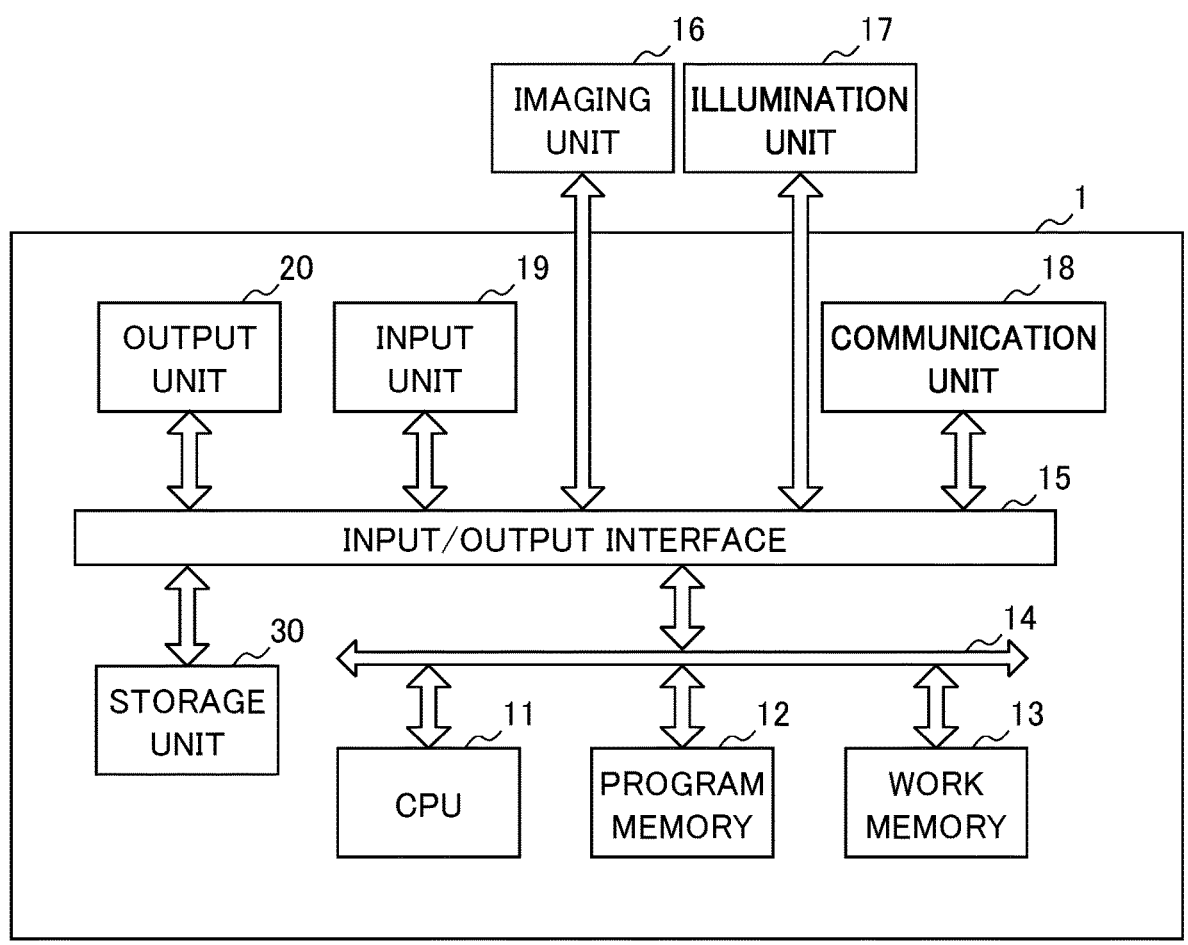
FIG. 2 is a block diagram showing the hardware configuration of the image processing apparatus according to an embodiment of the present invention.

Hereinafter, exemplary embodiments of the present invention will be described with reference to the drawings.

FIG. 1 is a system configuration diagram showing the configuration of an image processing system S including an image processing apparatus 1 according to an embodiment of the present invention. The image processing system S shown in FIG. 1 detects an abnormality in a conveyor chain 21 by image analysis.

[Measurement Target]

First, the conveyor chain 21 as a measurement target will be described. The conveyor chain 21 is an endless member which is suspended on sprockets (not shown) of a conveyor device. The driving force of a chain drive unit 22 is transmitted to the conveyor chain 21 via a transmission means such as a sprocket, allowing the conveyor chain 21 to move around a predetermined route at a predetermined speed. It should be noted that the conveyor chain 21 is configured to be able to switch the moving speed stepwise depending on the application of the target to be moved.

The conveyor chain 21 of the present embodiment is structured such that a pair of outer links 23 are coupled by a pin 25 in a state of sandwiching an inner link 24 from both sides. It should be noted that the arcs of broken line in FIG. 1 each show a part of the outer shape of the inner link 24.

The pin 25 is provided for each of the coupling portions between the outer link 23 and the inner link 24. The pin 25 is a measurement target that is individually identified by the image processing apparatus 1 of the present embodiment. The pins 25 are aligned in the moving direction of the conveyor chain 21. It should be noted that the moving direction corresponds to the direction of the arrow in FIG. 1.

The number of pins 25 of the conveyor chain 21 is defined as n. As described above, since the conveyor chain 21 is an endless member, the next pin of the n-th pin 25-$n$ corresponds to the first pin 25-1. In the present embodiment, in order to recognize the first pin 25-1 in the image processing to be described later, a marking 26 is applied to the pin 25-1. The marking 26 is a mark which is conveniently provided for identifying the starting position of the conveyor chain 21 which is circulating. The marking 26 is attached to, for example, the first pin 25-1 or the outer link 23, the inner link 24, or the like to which the pin 25-1 is connected. The marking 26 is configured such that the first pin 25-1 can be identified in the image processing by way of color, pattern, shape, or a combination thereof. For example, the marking 26 is applied to the conveyor chain 21 with a coloring by an inspector.

In the following description, when the pins 25 need to be described individually, the first pin shall be defined as the pin 25-1 for convenience, and a pin 25-2, a pin 25-3, a pin 25-4, a pin 25-5, a pin 25-6, a pin 25-7, . . . a pin 25-*n* shall be subsequently defined in this order. Furthermore, the distance of the linear line connecting the center of the first pin 25-1 and the center of the second pin 25-2 is defined as a pin-to-pin distance L1, and a pin-to-pin distance L2, a pin-to-pin distance L3, . . . a pin-to-pin distance Ln−1 shall be subsequently defined in this order.

[System Configuration]

The overall configuration of the image processing system S according to the present embodiment will be described. The image processing system S includes an imaging unit 16, an illumination unit 17, and the image processing apparatus 1.

The imaging unit 16 is an imaging means for acquiring an image for image analysis by capturing a moving image of the conveyor chain 21 which circulates at a constant frame rate. The imaging position of the imaging unit 16 is appropriately set in consideration of the configuration of the conveyor chain 21 and the workability of inspection work.

The imaging unit 16 of the present embodiment includes an optical lens unit 161 and an image sensor 162 as main components. In order to image the subject, the optical lens unit 161 includes a lens for condensing light such as, a focus lens, a zoom lens, or the like. The image sensor 162 includes a photoelectric conversion element of CMOS (Complementary Metal Oxide Semiconductor) type, AFE (Analog Front End), or the like. The image processing apparatus 1 generates a frame (image) from the signal outputted from the imaging unit 16. The signal outputted from the imaging unit 16 is hereinafter referred to as "frame". The frame data is appropriately supplied to the image processing apparatus 1.

The illumination unit 17 is an illumination means for illuminating the conveyor chain 21 which is a subject of the imaging unit 16. The illumination unit 17 adjusts the illuminance and color components to illuminate the conveyor chain 21, making it possible to reliably prepare the imaging environment of the imaging unit 16. The illuminance of the illumination unit 17 is preferably equal to or greater than the external light. By establishing the illuminance of the illumination unit 17 as the dominant light equal to or greater than the external light, it is possible to perform a more accurate abnormality detection by the image analysis to be described later.

The image processing apparatus 1 performs image analysis processing based on the frame data outputted from the imaging unit 16 to detect an abnormality of the conveyor chain 21. The information detected by the image processing apparatus 1 can be transmitted to an external device 5.

[Hardware Configuration]

The hardware configuration of the image processing apparatus 1 of the present embodiment will be described. FIG. 2 is a block diagram showing the hardware configuration of the image processing apparatus 1 according to an embodiment of the present invention.

As illustrated in FIG. 2, the image processing apparatus 1 includes a CPU (Central Processing Unit) 11, program memory 12 including ROM (Read Only Memory) and the like, work memory 13 including RAM (Random Access Memory) and the like, a bus 14, an input/output interface 15, a communication unit 18, an input unit 19, an output unit 20, and a storage unit 30.

The CPU 11 executes various kinds of processing in accordance with a program recorded in the program memory 12 or a program loaded into the work memory 13 from the program memory 12. Data required for the CPU 11 to perform various kinds of processing including image processing is also stored in the work memory 13 as appropriate. The communication unit 18 and the input unit 19 are connected to the input/output interface 15. Furthermore, the imaging unit 16 and the illumination unit 17 are connected to the input/output interface 15 in a wired manner or wirelessly.

The communication unit 18 performs communication with the external device 5 or another device (not shown) via a network including the Internet. The communication unit 18 communicates with the external device 5 via a wired or wireless interface, and transmits the image-captured frame data and the detection result to the external device 5.

The input unit 19 includes various buttons and the like, receives an instruction operation of the user, and inputs various types of information in accordance with the received instruction operation. The output unit 20 includes a display unit for displaying images, a speaker for outputting voices, and the like. It should be noted that, in a case in which a touch screen is included in the input unit 19, the input unit 19 and the output unit 20 may be integrally formed.

The storage unit 30 includes semiconductor memory such as DRAM (Dynamic Random Access Memory), and stores various types of data. The storage unit 30 stores various types of data related to image processing, information indicating a detection result, and the like.

[Functional Configuration]

Figure 3:
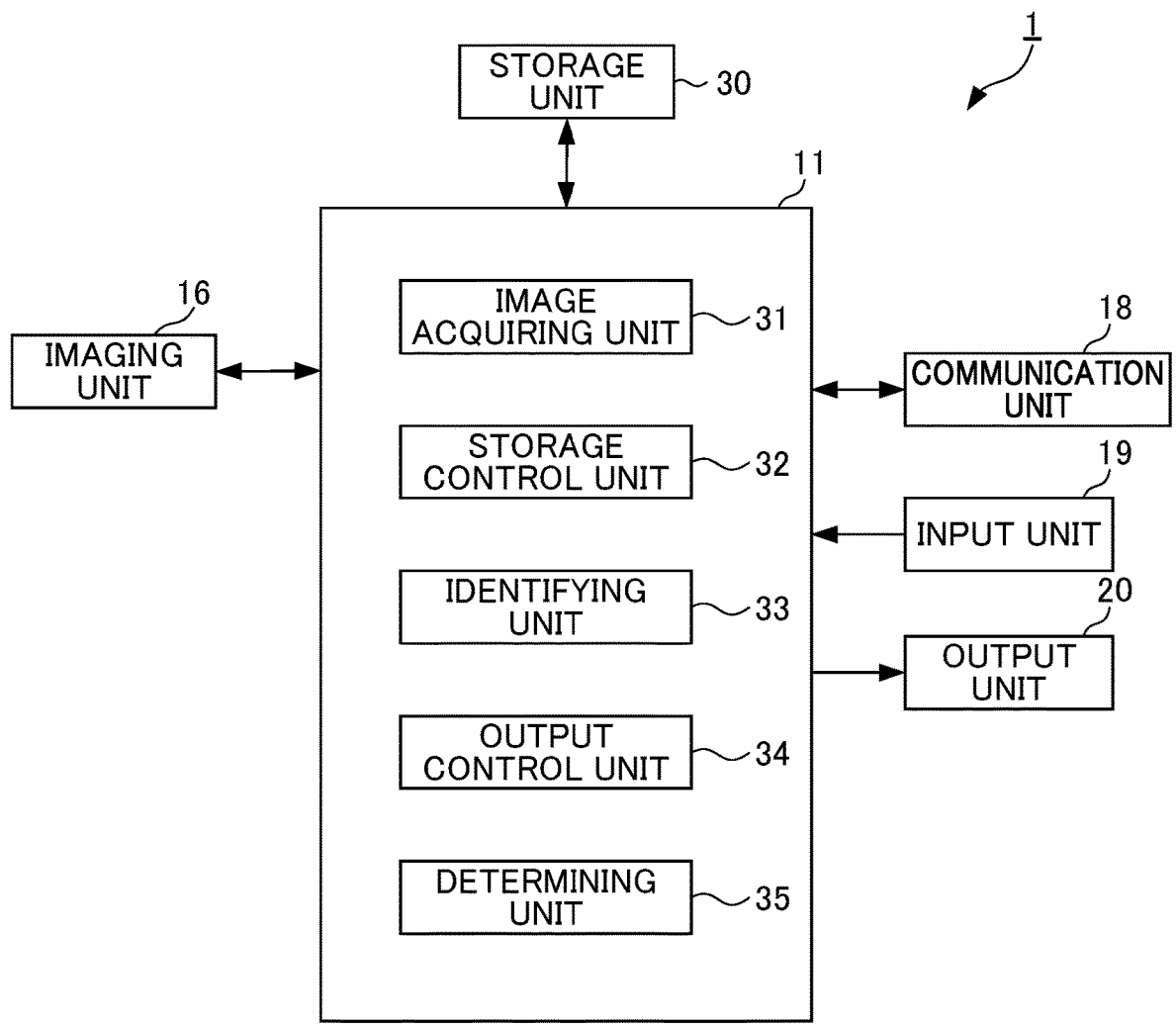
FIG. 3 is a functional block diagram showing the functional configuration for executing image processing among the functional configurations of the image processing apparatus according to an embodiment of the present invention.

FIG. 3 is a functional block diagram showing a functional configuration for executing image processing among the functional configurations of the image processing apparatus 1 according to an embodiment of the present invention. As shown in FIG. 3, an image acquiring unit 31, a storage control unit 32, an identifying unit 33, an outputting control unit 34, and a determining unit 35 function as sections for executing the image processing in the CPU 11 serving as a control unit.

The image acquiring unit 31 continuously acquires frame data (captured image) including the conveyor chain 21 outputted from the imaging unit 16 as a subject. More specifically, the frame rate (image acquisition timing) is controlled so as to acquire frame data including pins with frame data of 5 frames as one unit.

Furthermore, the image acquiring unit 31 distinguishes the pin 25-1 to which the marking 26 is applied from the other pins 25-2 to 25-*n* by the image analysis, and acquires a captured image of the conveyor chain 21 which circulates with the pin 25-1 as a leading position for convenience. For example, suppose that one circulation ranges when the pin 25-1 is recognized until the pin 25-1 is recognized again, the image acquiring unit 31 acquires the moving image of the two circulations.

The storage control unit 32 executes processing of distinguishing the plurality of individual pins (pins 25-1 to 25-*n*) constituting the conveyor chain 21 and storing them in the storage unit 30. Thereafter, the storage control unit 32 executes processing for associating template image (information image) data for performing matching processing with each of the plurality of pins 25 (pin 25-1 to 25-n) and storing them in the storage unit 30. The storage control unit 32 further executes processing for storing the pin-to-pin distance L (pin-to-pin distances L1 to Ln−1) in the storage unit 30 together with the positional relation of the plurality of pins 25 (pin 25-1 to 25-n).

It should be noted that the template image data stored in the storage unit 30 refers to image data indicating the result of calculating the Local Binary Patterns (LBP) feature for the image data of a rectangular region which is cut out with the pin 25 located at the center of the image. The LBP feature is a feature obtained by comparing the center pixel value with the peripheral pixel values.

The identifying unit 33 performs processing of comparing the feature amount extracted from the template image data stored in the storage unit 30 with the feature amount extracted from the frame data captured and newly acquired to thereby acquire the degree of similarity (i.e., performs matching processing). As described above, in the present embodiment, since the template image data of each of the plurality of pins 25-1 to 25-n is stored in the storage unit 30, each piece of the template image data used in the matching processing for each of the pins 25-1 to 25-n has a unique feature amount.

The output control unit 34 calculates the pin-to-pin distance L as a measurement target identified by the identifying unit 33. Thereafter, the output control unit 34 compares the calculated result with the past acquired pin-to-pin distance L stored in the storage unit 30, thereby outputting a comparison result. The comparison result is outputted, for example, as the amount of elongation from the previous measurement. It should be noted that, for the calculation of the pin-to-pin distance by the output control unit 34, it is possible to use the number of frames, the frame rate, the distance between the pins 25 in the frame data, and the like.

The determining unit 35 determines whether or not to execute the identifying processing for identifying the pins 25 on the continuously captured images. The criterion for determining whether or not the image is an image to be used by the determining unit 35 will be described later.

Next, the image processing by the image processing apparatus 1 of the present embodiment will be described with reference to the flowcharts. It should be noted that, in the following description, the steps are realized by the CPU 11 loading and executing the control program stored in the program memory 12 onto the work memory 13.

[Template Image Data Creation Processing]

Figure 4:
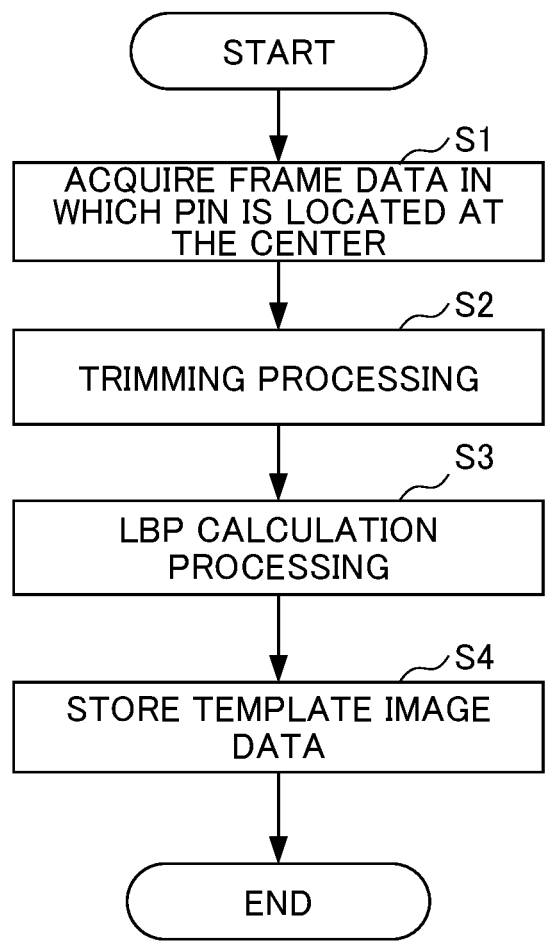
FIG. 4 is a flowchart showing a flow of template image data creation processing of the image processing apparatus according to an embodiment of the present invention.

First, the template image data creation processing will be described. FIG. 4 is a flowchart showing a flow of template image data creation processing of the image processing apparatus 1 according to an embodiment of the present invention.

First, the image acquiring unit 31 acquires frame data in which the position of the pin 25 is located at the center of the frame (image) (step S1). In the present embodiment, in order to improve the accuracy of matching processing described later, two pieces of frame data having different acquisition timings are acquired in each of which the pin is located at the center of the frame.

Next, the identifying unit 33 executes trimming processing for extracting, from the acquired frame data, data of an image region in which the pin 25 is located at the center (step S2). In this trimming processing, data of a rectangular image region is cut out in which the pin 25 is located at the center of the frame. Hereinafter, the data of the image region subjected to the trimming processing will be described as trimming image data.

Next, LBP calculation processing is performed on each of the two pieces of trimming image data acquired by the identifying unit 33.

Next, the storage control unit 32 stores the template image (information image) data as a result of the execution of the LBP calculation processing in the storage unit 30 (step S4). In the present embodiment, two pieces of template image data are stored in the storage unit 30.

[Accumulation Processing of Template Image Data of Plurality of Pins upon Capturing Moving Image]

Figure 5:
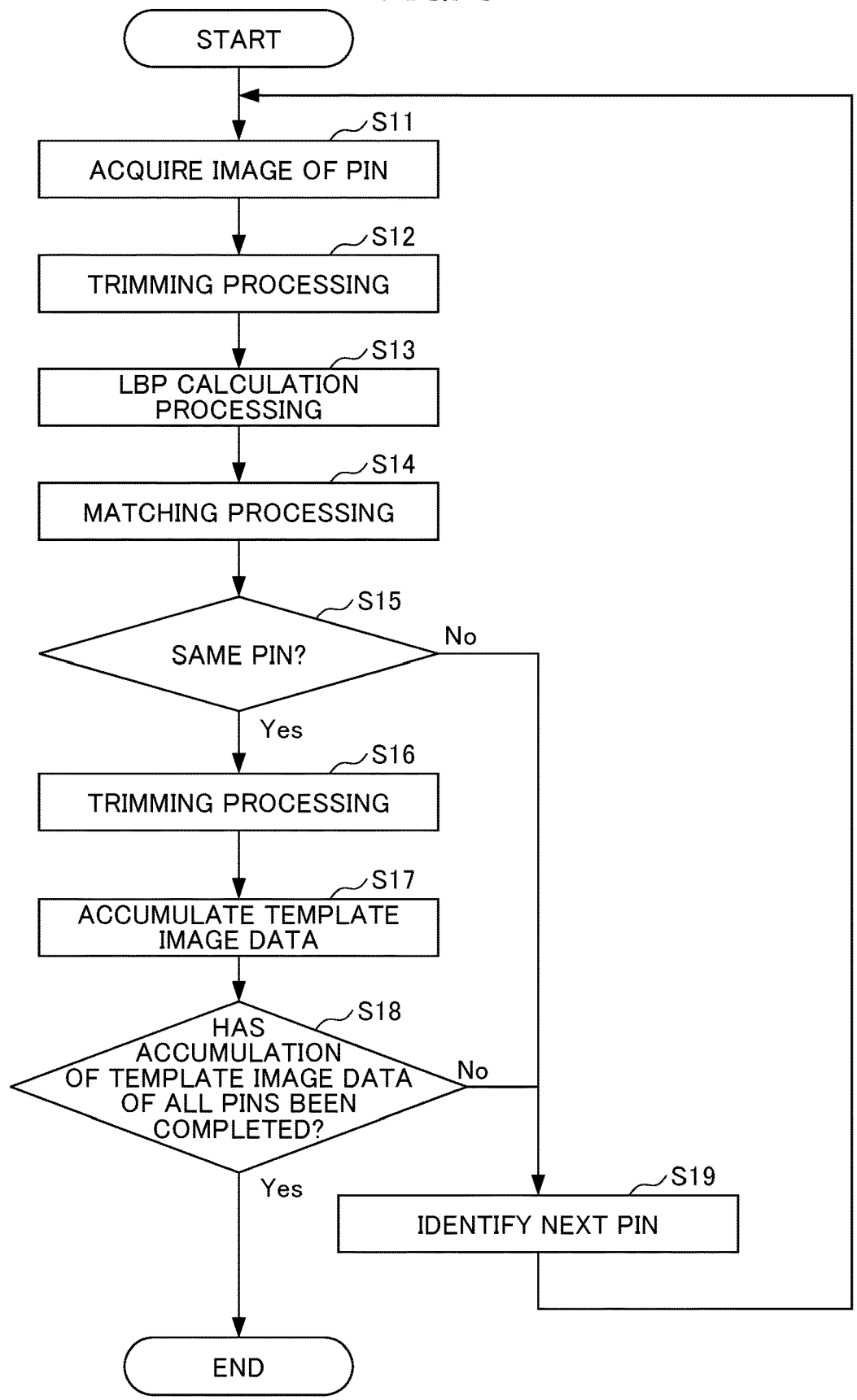
FIG. 5 is a flowchart showing a flow of template image data accumulation processing of the image processing apparatus according to an embodiment of the present invention.
Figure 6:
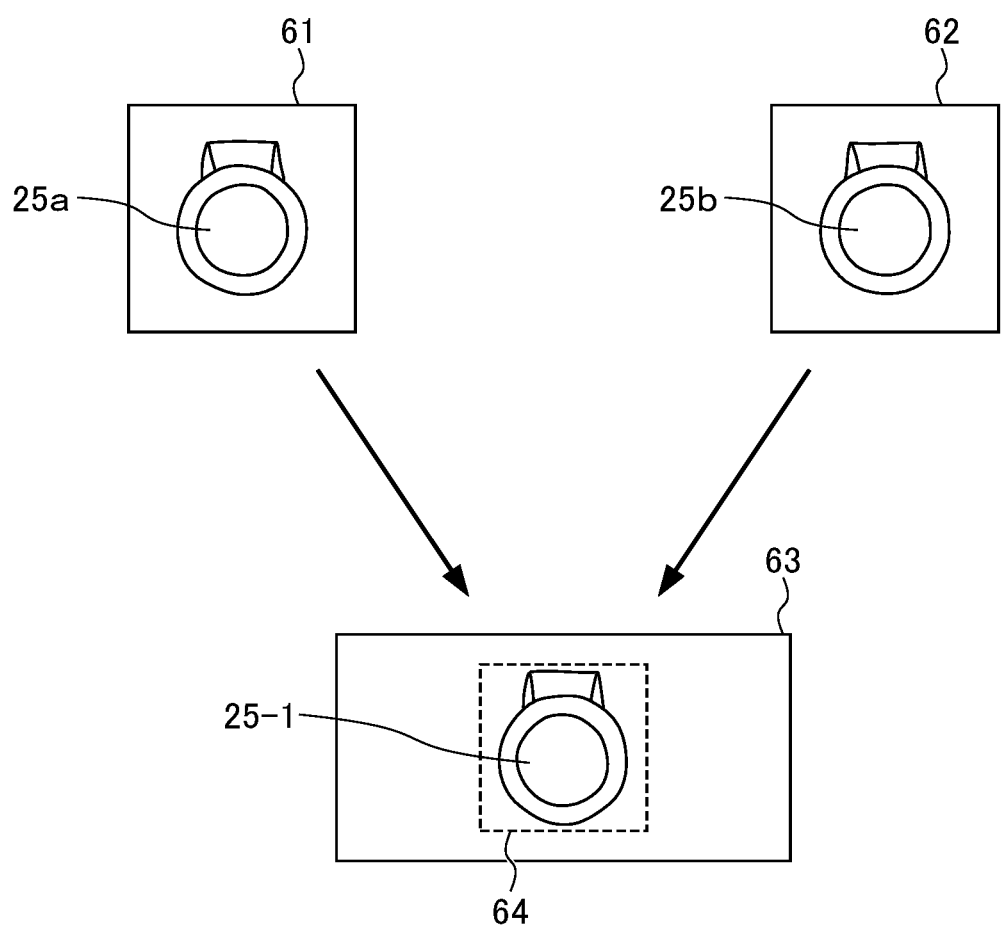
FIG. 6 is a schematic diagram for explaining matching processing in template image accumulation processing of the image processing apparatus 1 according to an embodiment of the present invention.

Next, accumulation processing of the template image data of a plurality of pins 25-1 to 25-n, which is executed after the processing of FIG. 4, will be described. FIG. 5 is a flowchart showing a flow of template image data accumulation processing of the image processing apparatus according to an embodiment of the present invention. FIG. 6 is a schematic diagram for explaining matching processing in template image accumulation processing of the image processing apparatus 1 according to an embodiment of the present invention. The pin 25 as a measurement target illustrated in FIG. 6 is the first pin 25-1.

When the processing is started, the image acquiring unit 31 acquires frame data including the pins 25 in the conveyor chain 21 in step S11. In this processing, frame data including the pin 25 of a specific number is acquired. For example, in a case in which the pin 25 on which the marking 26 is applied is set as the target to be acquired first, the frame data including the pin is acquired.

Next, the identifying unit 33 performs the trimming processing so as to extract data of an image region in which the pin 25 is located at the center, from the frame data including the pin 25 (step S12), and performs the LBP calculation processing on the data of the image region subjected to the trimming processing to thereby generate the target image 63 illustrated in FIG. 6 (step S13).

Next, the identifying unit 33 reads the template image acquired in the processing of FIG. 4 from the storage unit 30 with respect to the target image 63, and executes processing of acquiring the degree of similarity (i.e., the matching processing) (step S14). In the case of FIG. 6, the pin 25a of a template image 61 is different from the pin 25b of a template image 62. In the matching processing, the feature amount extracted from the template image 61 is compared with the feature amount extracted from the target image 63, and the degree of similarity between the pin 25a and the pin 25-1 is acquired. Similarly, the feature amount extracted from the template image 61 is compared with the feature amount extracted from the target image 63, and the degree of similarity between the pin 25b and the pin 25-1 is acquired.

Next, the identifying unit 33 determines whether or not the pin included in the image region subjected to the current trimming processing is the same as the pin indicated by the template image data at the position stored in the storage unit 30, based on the result of the matching processing (in step S15). In this determination processing, when the degree of similarity is equal to or greater than a reference value set in advance, it is determined as Yes, and the processing proceeds to step S16, and when the degree of similarity is less than the reference value, it is determined as No, and the processing proceeds to step S19.

In the present embodiment, the matching processing is performed twice for one measurement target. In a case of strictly determining the detection of the pin 25, it is possible to set the determination criterion so that it is determined as Yes when both the degree of similarity between the pin 25a and the pin 25-1 and the degree of similarity between the pin 25b and the pin 25-1 exceed the reference value.

In a case in which it is determined that the pin included in the image region subjected to the current trimming processing is the same as the pin indicated by the template image data at the position stored in the storage unit 30 (step S15; Yes), the identifying unit 33 trims the region set in advance for the pin 25-1 and the vicinity thereof with respect to the target image 63 to thereby generate the template image data corresponding to the template image 64 (step S16), as shown in FIG. 6. Thereafter, the storage control unit 32 stores and accumulates the template image data in the storage unit 30 in association with the pin number (in step S17).

Next, the identifying unit 33 refers to the storage unit 30 and determines whether or not the accumulation of the template image data of all of the pins 25-1 to 25-n has been completed (in step S18). When it is determined that the accumulation of the image data of all the templates has been completed, it is determined as Yes, and the processing is completed.

In addition, in a case in which it is determined that the pin included in the image region subjected to the current trimming processing is not the same as the pin indicated by the template image data at the position stored in the storage unit 30 (step S15; No), or in a case in which it is determined that the accumulation of the template image data has not been completed for all of the pins (step S18; No), the pin that is supposed to be acquired next is identified, and the processing returns to step S11 (step S19). For example, in a case in which the matching processing is performed on the pin 25-1, the pin 25-2 at the next position is identified. It should be noted that, in a case in which the template image data is not accumulated for all of the pins in the first circulation and there is a missing pin, the template image data is accumulated for the pin in the next circulation, which is when a moving image is captured in the second circulation.

Through the series of processing described above, the template image data of all of the pins 25 of the conveyor chain 21 will be accumulated in the storage unit 30. The accumulated template image data is used for processing for detecting a change in the shape of the conveyor chain 21.

It should be noted that the template image data is preferably acquired for a plurality of times for each pin, when considering surface changes due to lubricant or dust adhering to the conveyor chain 21, or rust due to aging degradation.

[Selection Processing of Target Image]

Figure 7:
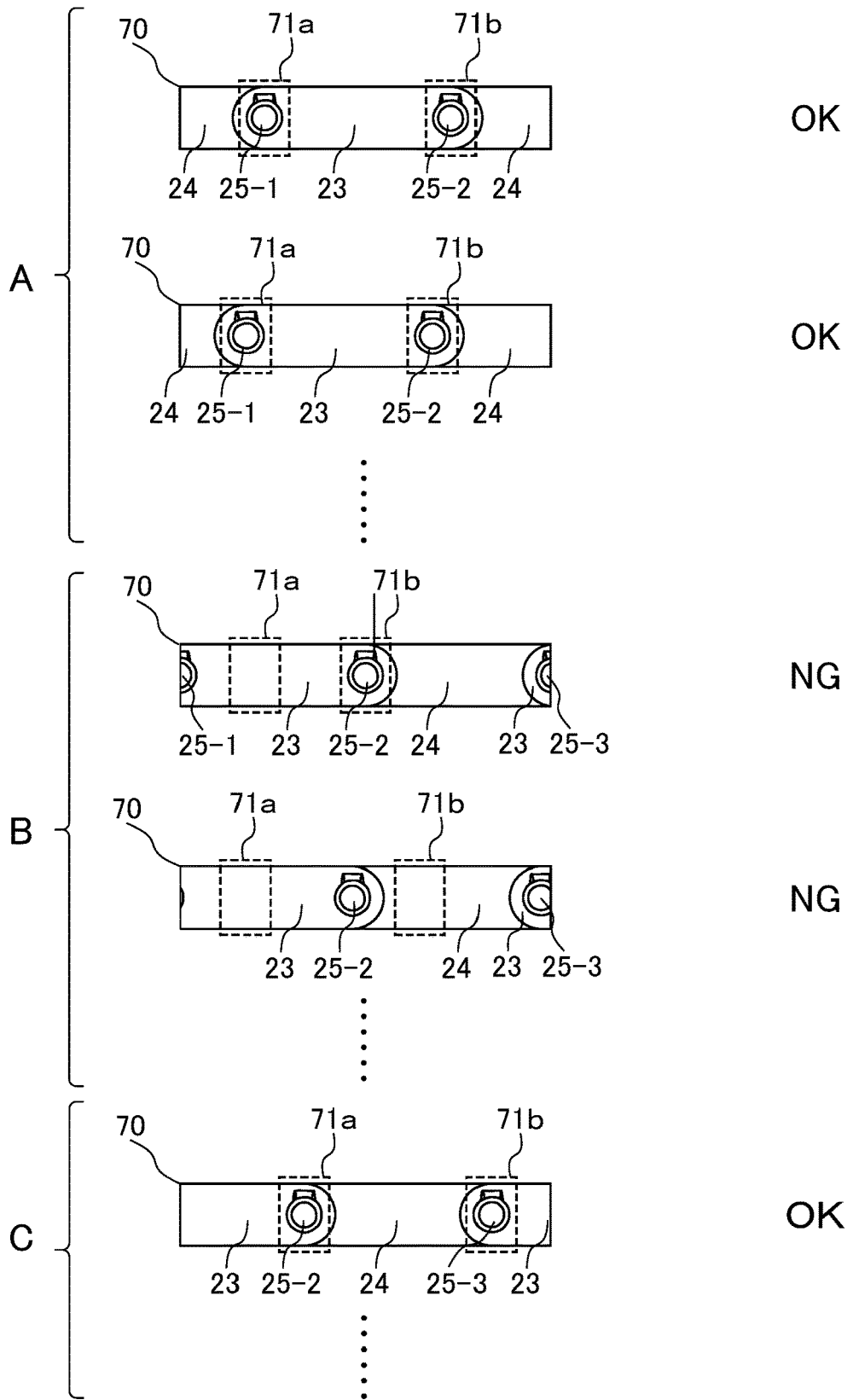
FIG. 7 is a schematic diagram for explaining selection processing of a target image of the image processing apparatus according to an embodiment of the present invention.

Next, the selection processing of a target image 70 (information image) used when detecting a change in the pin-to-pin distance, which is executed by the determining unit 35, will be described. FIG. 7 is a schematic diagram for explaining selection processing of the target image 70 of the image processing apparatus according to an embodiment of the present invention.

The series of target images 70 shown in FIG. 7 are frames (images) sequentially captured and acquired by the imaging unit 16 for the purpose of acquiring images including two pins 25 in order to acquire the pin-to-pin distance. In FIG. 7, the target image 70 on the upper side is the oldest, and becomes newer as it approaches the lower side of FIG. 7. A detection frame 71a set on the left side and the detection frame 71b set on the right side are respectively set in the frame, and the determining unit 35 determines whether or not the images of the two pins 25 in the frame can be detected by these detection frames 71a and 71b, thereby determining whether or not the images of the two pins 25 are included in the target image 70.

In FIG. 7, the image of the pin 25-1 is fit within the detection frame 71a, and the image of the pin 25-2 is fit within the detection frame 71b in any of the target images 70 included in the group A. That is, the images of the two pins 25-1 and 25-2 are included in one target image 70, hence it is a frame that can be used for the matching processing and the measurement of the pin-to-pin distance. Therefore, the determining unit 35 determines that the target image 70 included in group A can be used for the matching processing and the measurement of the pin-to-pin distance L.

Meanwhile, in the target image 70 included in group B, the image of the pin 25-1 does not exist in the detection frame 71a. Therefore, the determining unit 35 determines that the target image 70 included in group B is an image that cannot be used for the matching processing or the measurement of the pin-to-pin distance. It should be noted that the detection frame 71a moves to a position set in advance to detect the image of the next pin 25-2 when the image of the pin 25-1 is no longer detected. Furthermore, the detection frame 71b moves to the left until a predetermined reference position (for example, near the center), as shown in the latest target image 70 of group B.

The target image 70 included in group C is in a state in which the image of the pin 25-2 is fit in the detection frame 71a and the image of the pin 25-3 is fit in the detection frame 71b as time further elapses. That is, the images of two pins 25-2 and 25-3 are included in one target image 70, and hence it is a frame that can be used for the measurement of the pin-to-pin distance. Therefore, the determining unit 35 determines that the target image 70 included in group C is an image that can be used for the matching processing or the measurement of the pin-to-pin distance L.

In a case in which the determining unit 35 determines that the two pins 25 are included in the target image 70, the storage control unit 32 stores the image data corresponding to the target image in the storage unit 30. Furthermore, the storage control unit 32 determines whether or not the image of the pin as a detection target has been switched based on a reference value set in advance, and stores in the storage unit 30 information identifying which among the first to N-th set of the pins 25 included in the target image 70 is, in association with the image data of the target image 70. More specifically, in a case in which the NG state (group B) consecutively occurs four times after the OK state (group A) consecutively occurring 10 times, and then the OK state consecutively occurs 4 or more times again in frame unit (frame), it is determined that the measurement target has been replaced with the next pin 25.

[Pin-to-Pin Measurement Processing]

Figure 8:
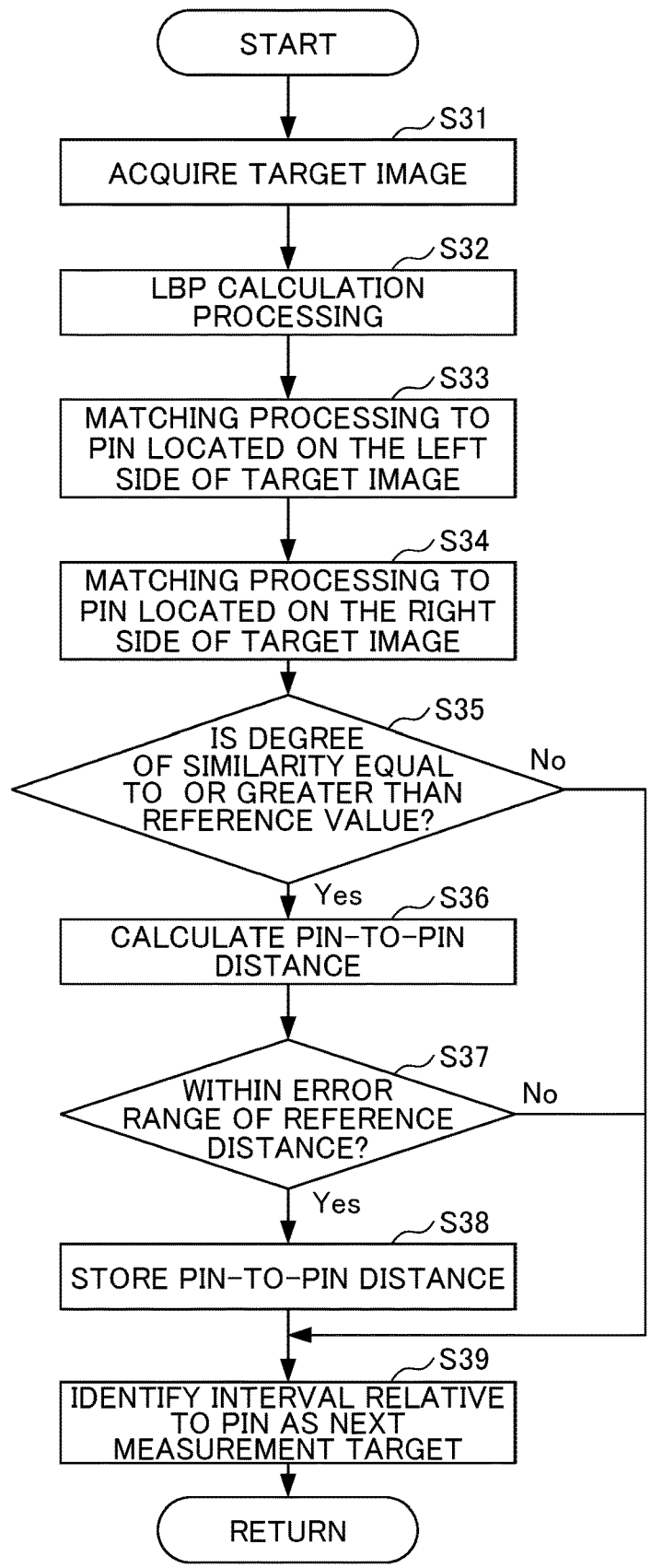
FIG. 8 is a flowchart showing a flow of pin-to-pin measurement processing of the image processing apparatus according to an embodiment of the present invention.
Figure 9:
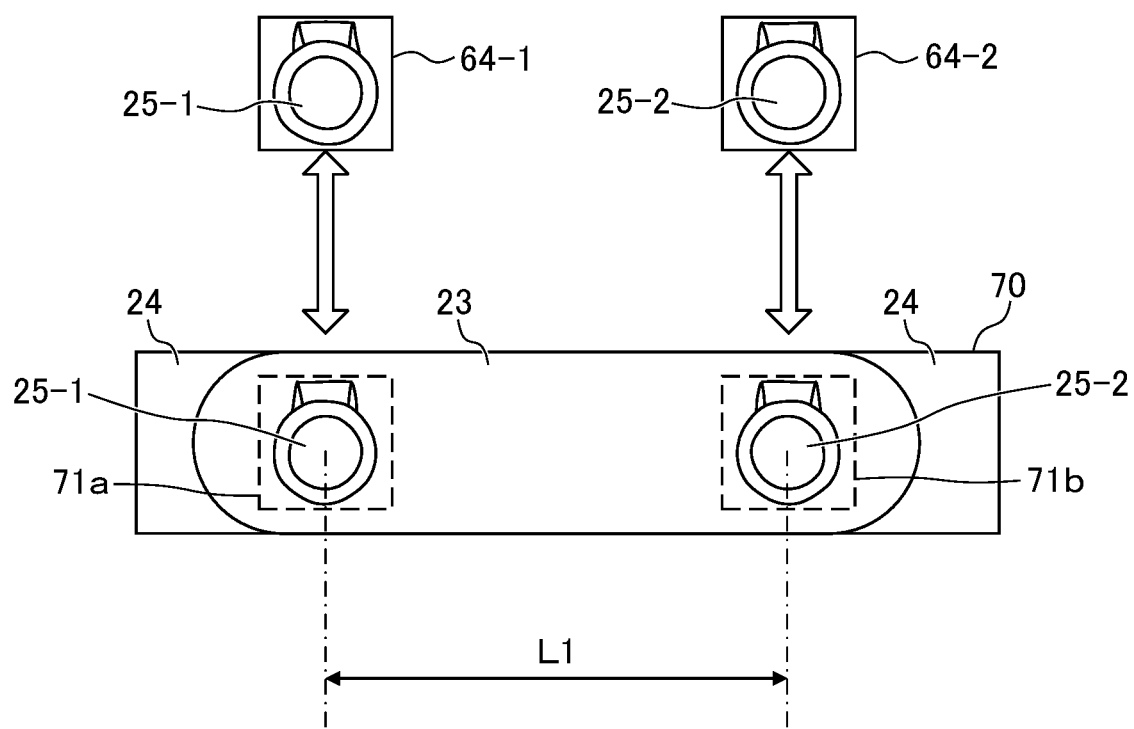
FIG. 9 is a schematic diagram for explaining measurement processing of a pin-to-pin distance of the image processing apparatus according to an embodiment of the present invention.

Next, the measurement processing of the pin-to-pin distance by the image processing apparatus 1 of the present embodiment will be described. FIG. 8 is a flowchart showing a flow of pin-to-pin measurement processing of the image processing apparatus 1 according to an embodiment of the present invention. FIG. 9 is a schematic diagram for explaining measurement processing of the pin-to-pin distance L of the image processing apparatus 1 according to an embodiment of the present invention. In the following description, a case in which the two pins 25 included in the target image 70 are the first pin 25-1 and the second pin 25-2 will be described as an example.

First, the image acquiring unit 31 starts capturing a moving image of the conveyor chain 21 by the imaging unit 16, analyzes each frame included in the captured moving image, and acquires a target image 70 including two pins 25 (step S31). The target image 70 may be an image subjected to the trimming processing to include a region including the two pins 25. In the processing of acquiring the target image 70, the number (1 to N) of the pins 25 in the target image 70 is also acquired.

Next, the identifying unit 33 performs the LBP calculation processing on the target image 70 as preprocessing (step S32). Next, as shown in FIG. 9, the identifying unit 33 executes the matching processing for acquiring the degree of similarity between the pin 25-1 positioned on the left side of the target image 70 and the pin 25-1 in a template image 64-1 corresponding to the pin 25-1 (step S33). Similarly, the identifying unit 33 executes the matching processing for acquiring the degree of similarity between the pin 25-2 positioned on the right side of the target image 70 and the pin 25-2 in a template image 64-2 corresponding to the pin 25-2 (step S33).

It should be noted that, when a plurality of template images 64 exist for one pin 25, the matching processing may be performed a plurality of times between each of the plurality of template images 64 and the target pin 25.

The identifying unit 33 determines whether the pins 25-1 and 25-2 have been successfully detected as a result of the matching processing performed on the left pin 25-1 and the right pin 25-2 of the target image 70 (step S35).

When both the left pin 25-1 and right pin 25-2 are properly detected, the processing proceeds to step S36 (step S35; Yes). On the other hand, when at least one of the left pin 25-1 or the right pin 25-2 has not been detected, the processing proceeds to step S39 (step S35; No).

In step S36, the pin-to-pin distance L is calculated by the identifying unit 33 (step S36). Next, the identifying unit 33 determines whether the pin-to-pin distance L is within an error range of the reference distance (step S37). When the calculated pin-to-pin distance L deviates from the error range of the reference distance, or when the degree of similarity outputted by the output control unit 34 in step S35 is less than the reference value, the processing proceeds to step S39.

In a case in which it is determined that the pin-to-pin distance L is within the error range of the reference distance set in advance (step S37; Yes), the storage control unit 32 executes the processing of storing the pin-to-pin distance L calculated in step S38 in the storage unit 30 as the pin-to-pin distance L1 of the pin 25-1 and the pin 25-2 (step S38). In a case in which it is determined that the pin-to-pin distance L is not within the error range of the reference distance (step S37; No), the processing proceeds to step S39 without passing through step S38.

In step S39, the identifying unit 33 identifies an interval relative to the next pin (step S39). In the example of FIG. 9, a pin-to-pin distance L2 between pins 25-2 and 25-3 is identified as the pin-to-pin distance as a measurement target. After the step S39, the processing returns to the step S31, and the processing of step S31 and later is executed between the pins as a next measurement target.

As described above, the pin-to-pin distances L1 to Ln−1 for all of the pins 25-1 to 25-2 are acquired by a series of processing. It should be noted that the template image 64 is updated at an appropriate timing.

[Comparison Processing of Pin-to-Pin Distance]

The output control unit 34 of the present embodiment compares the acquired pin-to-pin distances L1 to Ln−1 with the above-described reference distance set in advance to thereby output a comparison result. More specifically, the storage unit 30 stores a reference distance set in advance, and the output control unit 34 determines whether or not each of the acquired pin-to-pin distances L1 to Ln−1 has elongated a predetermined distance or more from the reference distance and, when it is determined that it has elongated a predetermined distance or more, transmits a comparison result indicating that an elongation has occurred in the conveyor chain 21 to the output unit 20 or the external device 5. At this time, a place where the elongation has occurred can be identified and displayed.

The effect of the image processing apparatus 1 of the present embodiment will be described. The image processing apparatus 1 according to the present embodiment includes: the image acquiring unit 31 (an image acquiring means) that acquires an image of the conveyor chain 21 (an object) in which a plurality of pins 25-1 to 25-n (subjects), which are individually identifiable, are provided in a predetermined direction, the image including at least two pins 25 (for example, the pins 25-1 and 25-2) among the plurality of pins 25; the identifying unit 33 (an identifying means) that generates an information image (for example, the target image 70) including a feature amount of each of the pins 25 included in the image acquired by the image acquiring unit 31, and identifies each of the pins 25 (for example, the pins 25-1 and 25-2) by comparing with an information image (for example, the template images 64-1 and 64-2) stored in advance in the storage unit 30 (a storage means); and the output control unit 34 (an output control means) that measures a distance between the subjects, each identified by the identifying unit 33, and controls to output a measurement result.

With such a configuration, it is possible to realize the image processing apparatus 1 capable of accurately measuring the distance between the pins 25 in the conveyor chain 21 in which a plurality of pins 25-1 to 25-n are arranged in a predetermined direction.

Furthermore, in the image processing apparatus 1 according to the present embodiment, the identifying unit 33 further compares a feature amount in the information image generated and a feature amount of the information image stored in advance in the storage unit 30 to acquire a degree of similarity between the pin 25 in the image acquired and a pin 25 identified based on the feature amount of the information image stored, thereby identifying each of the pins 25-1 to 25-n.

With such a configuration, since it is possible to determine whether or not the pins 25-1 to 25-n can be identified with reference to the degree of similarity, it is possible to suppress the occurrence of a situation in which the degree of similarity is lower than the reference and the pin-to-pin distances are erroneously measured, making it possible to further improve the detection accuracy.

Furthermore, the image processing apparatus 1 according to the present embodiment further includes a storage control unit (the storage control unit 32) that controls to cause the information image generated by the identifying unit 33 to be stored in the storage unit 30 as a new information image corresponding to the pin 25.

With such a configuration, the information image (for example, the template image 64) serving as a reference at the time of identification can be updated based on the newly acquired image, a result of which the detection accuracy can be further improved in accordance with the actual condition of the pin 25.

Furthermore, in the image processing apparatus 1 according to the present embodiment, the identifying unit 33 detects the pin 25 from the image acquired by the image acquiring unit 31, and cuts out an image region having a predetermined area including the pin 25 detected to thereby generate the template image 64, or the template images 61 and 62.

With such a configuration, the template image 64 can be acquired only with the region necessary for identifying the pins 25, and thus the efficiency of the image processing can be further improved.

Furthermore, as described above, the object according to the embodiment is the conveyor chain 21, and the subject is the pin 25 of the conveyor chain 21.

Thus, it is possible to accurately measure the pin-to-pin distance L between a pin 25 and another pin 25 of the conveyor chain 21 that is moving, and thus it is possible to accurately evaluate the elongation state or the like between the pins 25 by the image analysis.

It should be noted that the present invention is not intended to be limited to the above-described embodiment, and modifications, improvements, and the like within a scope achieving the object of the present invention are encompassed by the present invention.

For example, the present invention can be applied to an electronic apparatus having an image processing function in general. For example, the present invention can be applied to various electronic devices such as a notebook type personal computer, a video camera, a portable navigation device, a smartphone, and a tablet.

The processing sequence described above can be executed by hardware, and can also be executed by software.

In other words, the functional configuration of FIG. 3 is merely an illustrative example, and the present invention is not particularly limited thereto. More specifically, the types of functional blocks employed to realize the above-described functions are not particularly limited to the examples shown in FIG. 3, so long as the image processing apparatus 1 can be provided with the functions enabling the aforementioned processing sequence to be executed in its entirety.

In addition, a single functional block may be configured by a single piece of hardware, a single installation of software, or a combination thereof.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or recording medium to a computer or the like.

The computer may be a computer equipped with dedicated hardware. In addition, the computer may be a computer capable of executing various functions, e.g., a general purpose personal computer, by installing various programs.

The storage medium containing such a program can not only be constituted by the removable medium distributed separately from the device main body for supplying the program to a user, but also can be constituted by a storage medium or the like supplied to the user in a state incorporated in the device main body in advance. The removable medium is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the program memory 12 of FIG. 1 in which the program is recorded or a not shown hard disk, etc.

It should be noted that, in the present specification, the steps defining the program recorded in the storage medium include not only the processing executed in a time series following this order, but also processing executed in parallel or individually, which is not necessarily executed in a time series.

Further, in the present specification, the terminology of the system means an entire apparatus including a plurality of apparatuses and a plurality of units.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An image processing apparatus comprising at least one processor executing the following processing including:
   image acquiring processing that acquires an image of an object in which a plurality of subjects, which are individually identifiable, are provided in a predetermined direction, the image including at least two subjects among the plurality of subjects;
   generating processing that generates an information image including a feature amount of each of the subjects included in the image acquired in the image acquiring processing;
   determining processing that determine, for each of the subjects, whether or not a degree of similarity between a template image stored in advance in memory and the information image generated in the generating processing satisfies a predetermined reference value; and
   output control processing that measures a distance between the subjects when it is determined in the determining processing that the degree of similarity of each of the subjects satisfies the predetermined reference value, and controls to output a measurement result,
   wherein, in the generating processing, the processor detects the subjects from the image acquired in the image acquiring processing, and, for each of the subjects, cuts out an image region having a predetermined area including the respective subject detected to thereby generate the information image, and
   wherein the object comprises a chain, and the subject comprises a pin of the chain.

2. The image processing apparatus according to claim 1, wherein the processor further executes storage control processing that controls to cause the information image generated in the generating processing to be stored in the memory as a new template image corresponding to the subject.

3. The image processing apparatus according to claim 1, wherein, in the image acquiring processing, the processor acquires an image of a marking in association with each of the subjects, and executes an identifying processing that identifies the subjects included in the image based on the marking, wherein, in the determining processing, the processor determines, for each of the subjects, whether or not the degree of similarity between the template image identified in identifying processing and the information image generated in the generating processing satisfies the predetermined reference value, and the template image in association with each of the subjects is stored in memory.

4. The image processing apparatus according to claim 1, wherein, in the determining processing, the processor determines, for each of the subjects, whether or not the degree of similarity between the template image and the information image satisfies the predetermined reference value, the information image and the template image are generated for each of the subjects, and the subjects including a subject included in a first detection frame provided in a position offset toward one end of the image and a subject included in a second detection frame provided in a position offset toward other end of the image.

5. An image processing method comprising the steps of:

an image acquiring step that acquires an image of an object in which a plurality of subjects, which are individually identifiable, are provided in a predetermined direction, the image including at least two of the plurality of subjects;

a generating step that generates an information image including a feature amount of each of the subjects included in the image acquired in the image acquiring step;

a determining step that determine, for each of the subjects, whether or not a degree of similarity between a template image stored in advance in memory and an information image generated in the generating step satisfies a predetermined reference value; and an output control step that measures a distance between the subjects when it is determined in the determining step that the degree of similarity of each of the subjects satisfies the predetermined reference value, and controls to output a measurement result, wherein the generating step further includes detecting the subjects from the image acquired in the image acquiring step, and, for each of the subjects, cutting out an image region having a predetermined area including the respective subject detected to thereby generate the information image, and wherein the object comprises a chain, and the subject comprises a pin of the chain.

6. The image processing method according to claim 5, further comprising a storage control step that controls to store, in the memory, the information image generated in the generating step as a new template image corresponding to the subject.

7. The image processing method according to claim 5, wherein the image acquiring step further includes an identifying step that acquires an image of a marking in association with each of the subjects, and identifies the subjects included in the image based on the marking, the determining step includes determining, for each of the subjects, whether or not the degree of similarity between the template image identified in identifying step and the information image generated in the generating step satisfies the predetermined reference value, and the template image in association with each of the subjects is stored in memory.

8. The image processing method according to claim 5, wherein the determining step further includes determining, for each of the subjects, whether or not the degree of similarity between the template image and the information image satisfies the predetermined reference value, the information image and the template image are generated for each of the subjects, and the subjects including a subject included in a first detection frame provided in a position offset toward one end of the image and a subject included in a second detection frame provided in a position offset toward other end of the image.

9. A non-transitory computer-readable storage medium storing a program that is executed by a computer that comprises a processor of an image processing apparatus, the program being executable to cause the computer to perform operations comprising:

image acquiring processing that acquires an image of an object in which a plurality of subjects, which are individually identifiable, is provided in a predetermined direction, the image including at least two of the plurality of subjects;

generating processing that generates an information image including a feature amount of each of the subjects included in the image acquired in the image acquiring processing;

determining processing that determine, for each of the subjects, whether or not a degree of similarity between a template image stored in advance in memory and an information image generated in the generating step satisfies a predetermined reference value; and output control processing that measures a distance between the subjects when it is determined in the determining processing that the degree of similarity of each of the subjects satisfies the predetermined reference value, and controls to output a measurement result, wherein, in the generating processing, the processor further detects the subjects from the image acquired in the image acquiring processing, and, for each of the subjects, cuts out an image region having a predetermined area including the respective subject detected to thereby generate the information image, and wherein the object comprises a chain, and the subject comprises a pin of the chain.

10. The storage medium according to claim 9, wherein the processor further executes storage control processing that controls to store, in the memory, the information image generated in the generating processing as a new template image corresponding to the subject.

11. The storage medium according to claim 9, wherein the image acquiring processing further includes an identifying processing that acquires an image of a marking in association with each of the subjects, and identifies the subjects included in the image based on the marking, the determining processing includes determining, for each of the subjects, whether or not the degree of similarity between the template image identified in identifying step and the information image generated in the generating step satisfies the predetermined reference value, the template image in association with each of the subjects is stored in memory.

12. The storage medium according to claim 9,
wherein the determining processing further includes
determining, for each of the subjects, whether or not the
degree of similarity between the template image and
the information image satisfies the predetermined reference value, the information image and the template
image are generated for each of the subjects, the
subjects including a subject included in a first detection
frame provided in a position offset toward one end of
the image and a subject included in a second detection
frame provided in a position offset toward other end of
the image.

\* \* \* \* \*

UNITED STATES PATENT AND TRADEMARK OFFICE
CERTIFICATE OF CORRECTION

PATENT NO. : 11,783,468 B2
APPLICATION NO. : 17/204697
DATED : October 10, 2023
INVENTOR(S) : Muneyuki Ishihara Page 1 of 1

It is certified that error appears in the above-identified patent and that said Letters Patent is hereby corrected as shown below:

On the Title Page

In Item (54) under "Title", and in the Specification, Column 1, Line 3, delete "PNIS" and insert -- PINS --, therefor.

In the Claims

In Column 14, Claim 10, Line 49, delete "storage medium" and insert -- non-transitory computer-readable storage medium --, therefor.

In Column 14, Claim 11, Line 55, delete "storage medium" and insert -- non-transitory computer-readable storage medium --, therefor.

In Column 15, Claim 12, Line 1, delete "storage medium" and insert -- non-transitory computer-readable storage medium --, therefor.

Signed and Sealed this
Ninth Day of July, 2024

Katherine Kelly Vidal
*Director of the United States Patent and Trademark Office*